United States Patent [19]

Brent

[11] Patent Number: 5,666,243
[45] Date of Patent: Sep. 9, 1997

[54] SPRING LOADED STACKED ACTUATOR ASSEMBLY

[75] Inventor: George L. Brent, Boulder, Colo.

[73] Assignee: Seagate Technology, Inc., Scotts Valley, Calif.

[21] Appl. No.: 707,121

[22] Filed: Sep. 3, 1996

[51] Int. Cl.⁶ .................... G11B 5/55; G11B 21/08
[52] U.S. Cl. ............................. 360/106; 360/104
[58] Field of Search ............................. 360/106, 104

[56] References Cited

U.S. PATENT DOCUMENTS

| | | | |
|---|---|---|---|
| 4,635,151 | 1/1987 | Hazebrouck | 360/105 |
| 4,716,478 | 12/1987 | Walsh et al. | 360/106 |
| 4,814,652 | 3/1989 | Wright | 360/98.07 |
| 4,979,063 | 12/1990 | Ghose et al. | 360/106 |
| 5,029,026 | 7/1991 | Stefansky et al. | 360/97.02 |
| 5,109,310 | 4/1992 | Ohkjita et al. | 360/106 |
| 5,117,318 | 5/1992 | Immler et al. | 360/105 |
| 5,134,532 | 7/1992 | Svendsen et al. | 360/106 |
| 5,482,381 | 1/1996 | Krum et al. | 360/106 |
| 5,491,598 | 2/1996 | Stricklin et al. | 360/106 |

Primary Examiner—Robert S. Tupper
Attorney, Agent, or Firm—Kinney & Lange, P.A.

[57] ABSTRACT

A stacked actuator assembly includes a hub having an axis of rotation, a first member fixed in a first direction along the axis of the hub, a second member fixed in a second opposite direction along the axis of a hub, an actuator arm coupled about the hub between the first and second members and a spring coupled about the hub between the first and second members. The spring axially clamps the plurality of actuator arms between the first and second members.

13 Claims, 3 Drawing Sheets

SPRING LOADED STACKED ACTUATOR ASSEMBLY

BACKGROUND OF THE INVENTION

The present invention relates to disc drive assemblies. In particular, the present invention relates to a stacked actuator assembly including a spring for axially clamping the plurality of actuator arms between first and second axially fixed members.

Disc drives are commonly used with computers to store data on concentric tracks defined in magnetic codings formed on magnetic discs. The discs are attached to a rotating spindle which is powered by a spindle motor. Data is written to and read from selected tracks on a disc by a read/write transducer head. A pivotally mounted actuator supports the transducer head and moves the transducer head across the disc when the head is reading from or writing to the disc.

Pivotally mounted actuators typically include arms which extend from a central hub about which the actuator rotates or pivots. Actuators typically comprise what is known as a unitary E-block assembly wherein the actuator arms are integrally formed as part of the hub or a stacked arrangement in which each individual arm is stacked about a central hub. To prevent slipping of individual arms or other components in a stacked actuator, nuts or screws are typically used to fix the arms in proper alignment. However, rotation of the nuts or screws induces rotational forces which may cause alignment difficulties during assembly. In addition, misalignment of the individual actuator arms often results from thermal shifting after assembly. Misalignment of the actuator arms causes data reading and writing errors. As a result, there is a continuing need for a method and apparatus for fixing and reliably maintaining actuator arms of a stacked actuator in proper alignment.

SUMMARY OF THE INVENTION

The present invention is a stacked actuator assembly including a hub having an axis of rotation, a first axial stop about the hub and fixed along the axis of the hub, a second axial stop extending about the hub and fixed along the axis of the hub, an actuator arm coupled about the hub between the first and second axial stops and a spring coupled about the hub between the first and second axial stops. The spring applies a pure axial load to the actuator arm along the axis of the hub to axially clamp the actuator arm between the first and second axial stops.

In a preferred embodiment of the stacked actuator assembly, a plurality of actuator arms separated by a spacer are coupled about the hub between the first and second axial stops. In addition, the coil assembly is also coupled about the hub between the first and second axial stops. A spring is coupled about the hub between the first and second axial stops to axially clamp the plurality of actuator arms, spacers and the coil assembly between the first and second axial stops.

DETAILED DESCRIPTION OF THE PREFERRED EMBODIMENTS

Figure 1:
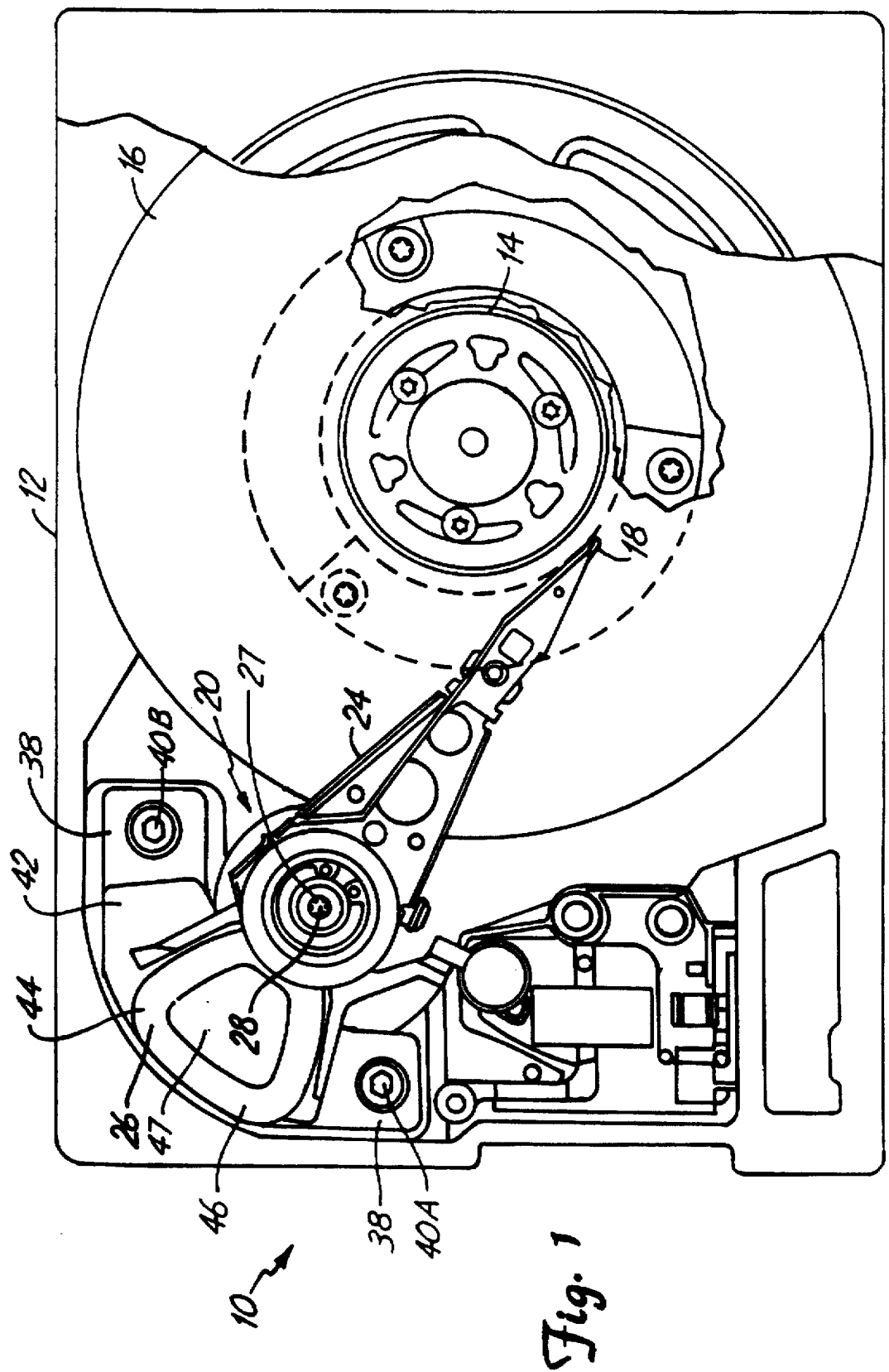
FIG. 1 is a top view of a disc drive including an actuator assembly.

FIG. 1 is a top view of disc drive 10 with portions removed or not shown for clarity. Disc drive 10 generally includes housing 12, spindle motor 14, memory storage discs 16, transducers 18 and actuator assembly 20. Housing 12 surrounds and encloses spindle motor 14, memory storage discs 16, transducers 18 and actuator assembly 20. Spindle motor 14 is conventionally known in the art and is mounted to housing 12. Spindle motor 14 supports and rotates memory storage discs 16 for accessing information stored on memory storage discs 16.

Memory storage discs 16 preferably comprise magnetic discs as are conventionally used in head disc assemblies. Memory storage discs 16 store data and information. As can be appreciated, disc drive 10 may utilize other types of discs, for example, optical discs, and other read/write technologies, for example, lasers.

Actuator assembly 20 supports and positions transducers 18 adjacent to memory storage discs 12 and selectively positions transducers 18 with respect to memory discs 16 for the retrieval and storage of information from and to discs 16. Actuator assembly 20 includes actuator arms 24 and voice coil assembly 26. Actuator assembly 20 rotatably supports actuator arms 24 about axis 27 with respect to memory storage discs 16 and is fixedly coupled to housing 12 by threaded fastener 28.

Actuator arms 24 are conventionally known in the art. Actuator arms 24 extend over and beneath surfaces of memory storage discs 16 to support transducers 18 with respect to memory storage discs 16.

Voice coil assembly 26 selectively rotates actuator arms 24 to selectively position transducers 16 adjacent to memory storage discs 16 for retrieving and storing information. As conventionally known, voice coil assembly 26 generally includes pole plates 38, support posts 40a, 40b, permanent magnets 42 and coil assembly 44. Pole plates 38 preferably consist of two arcuately curved metal plates. Pole plates 38 are spaced apart to form a gap and are mounted to housing 12 by support posts 40a, 40b. Permanent magnets 42 comprise two arcuately curved magnetic members. Permanent magnets 42 are coupled to an inside surface of pole plates 38 within the gap between pole plates 38. Pole plates 38 and support posts 40a, 40b provide returns for magnetic fields emanating from permanent magnets 42.

Coil assembly 44 is conventionally known in the art. Coil assembly 44 consists of a coil 46 of conducting wires wrapped about a center pole support member 47. Coil 46 and center pole 47 are positioned between permanent magnets 42. Upon supply of electrical current to coil 44, under appropriate control as is known in the art, the flux coupling created between the permanent magnets 42 and coil 46 moves coil assembly 44 transversely relative to pole plates 38 and permanent magnets 42. As a result, actuator arms 24, which are coupled to coil assembly 44, move about axis 27 of actuator assembly 20 in an arcuate path to position transducers 18 with respect to memory storage discs 16.

Figure 2:
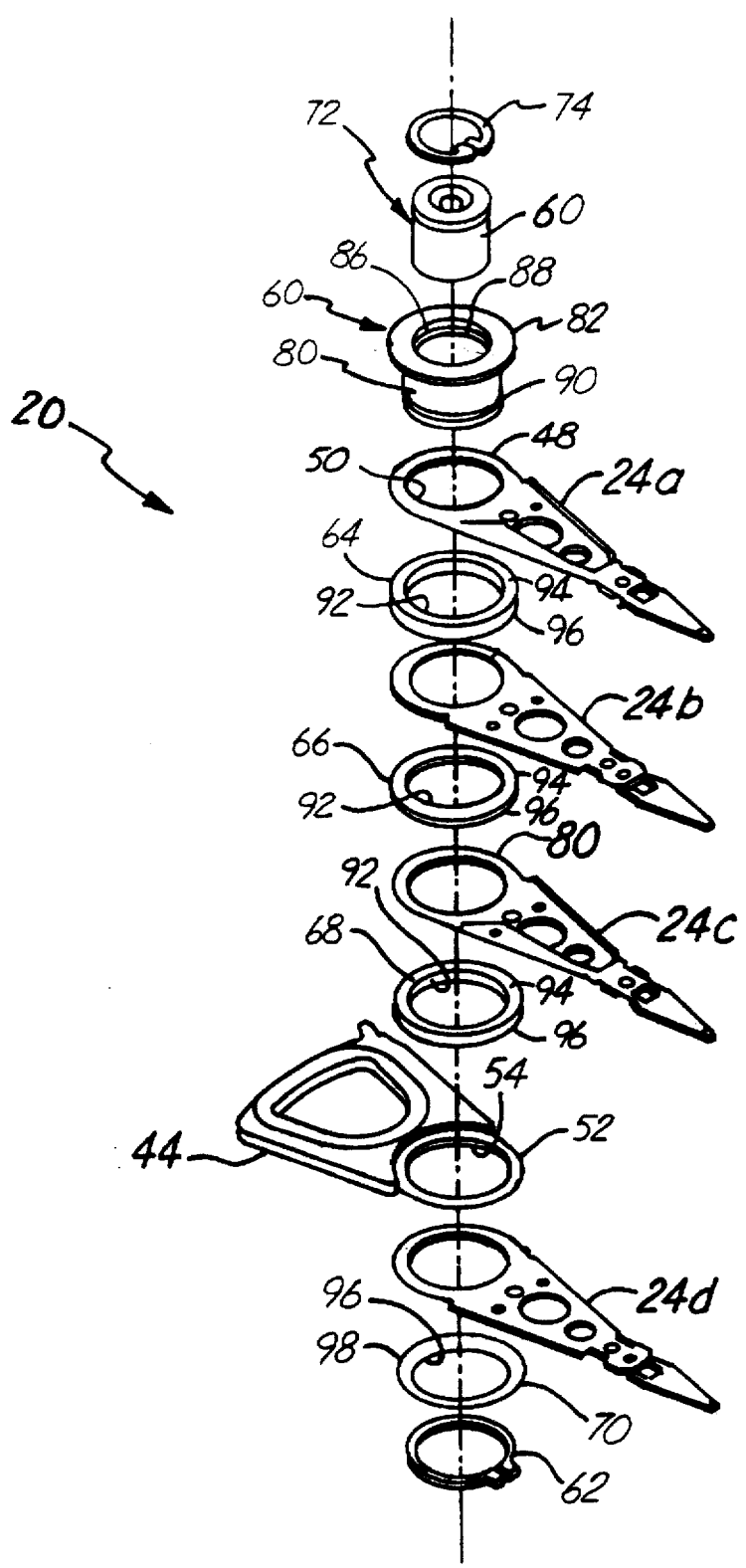
FIG. 2 is an exploded perspective view of a hub assembly, actuator arms and a fan tail of the actuator assembly.

FIG. 2 is an exploded perspective view illustrating actuator assembly 20 including actuator arms 24 and coil assembly 44 in greater detail. Actuator arms 24a, 24b, 24c and 24d each include an annular mounting portion 48 defining an opening 50 extending through mounting portion 48 and having an inner diameter sized for being coupled about arbor 60. Similar to actuator arms 24, coil assembly 44 includes an annular mounting portion 52 defining an opening 54 extending through mounting portion 52 and having an inner diameter sized for being coupled about arbor 60.

As shown by FIG. 2, actuator assembly 20 generally includes arbor 60, axial stop 62, spacers 64, 66 and 68, spring 70, bearing assembly 72 and bearing fastener 74.

Figure 3:
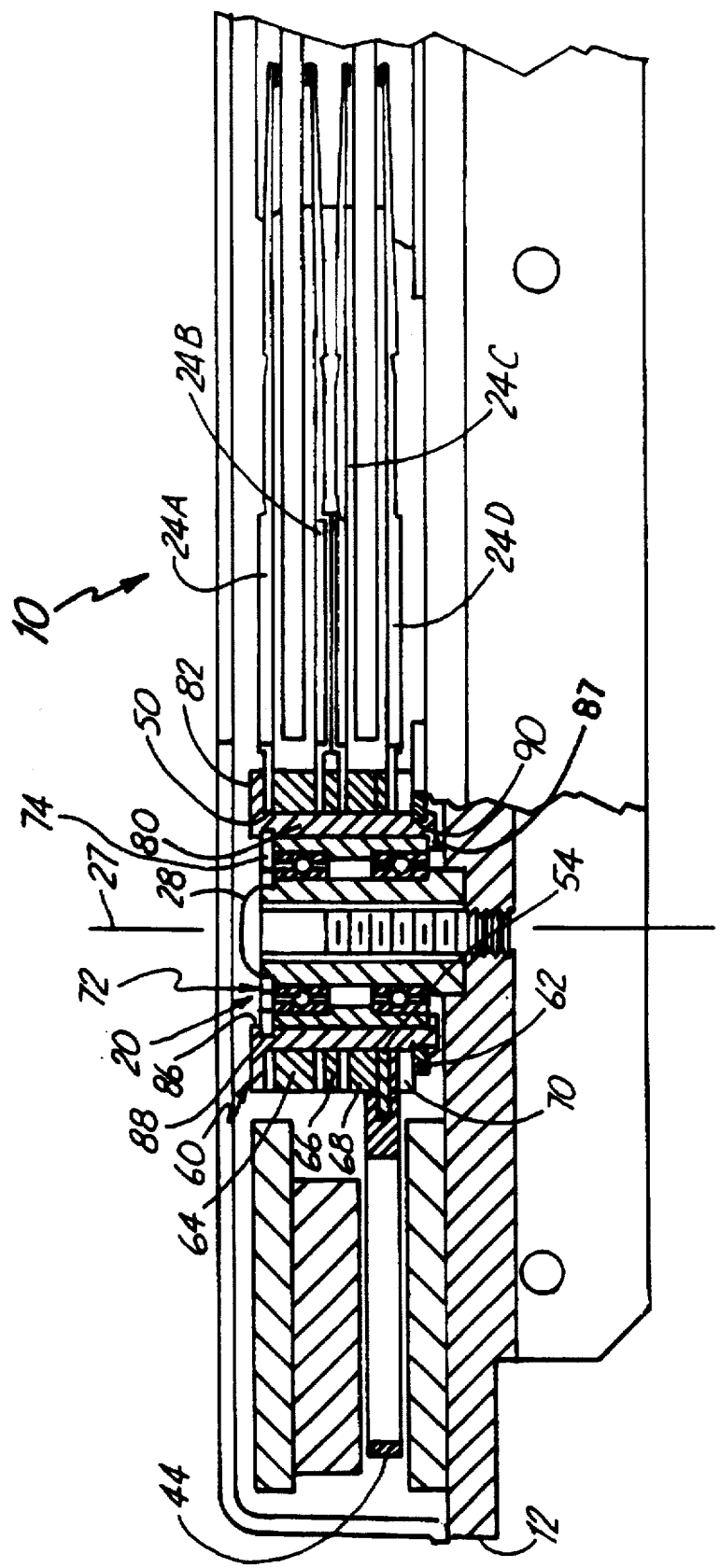
FIG. 3 is a cross-sectional view of the disc drive of FIG. 1.

Arbor 60 is a generally cylindrical shaped member having a central hub 80 and an outwardly extending lip 82. Hub 80 is an elongate tube defining axial bore 86, internal lip 87 (shown in FIG. 3), internal groove 88 and external groove 90. Axial bore 86 extends through hub 80 and is sized for receiving bearing assembly 72. Internal lip 87 (shown in FIG. 3) projects from hub 80 partially into axial bore 86 at a lower end of axial bore 86 opposite to lip 82. As best shown in FIG. 3, lip 87 acts as a stop for receiving bearing assembly 72. Internal groove 88 extends into hub 80 about bore 86 and is sized for receiving fastener 74. Groove 90 circumferentially extends about hub 70 and is sized for receiving axial stop 62. Hub 80 has an outer diameter sized for insertion through openings 50 and 54 of arms 24 and coil assembly 44, respectively, through spacers 64, 66, 68 and through spring 70. Hub 80 preferably has an axial length sufficient to retain actuator arms 24, spacers 64, 66 and 68 and spring 70.

Lip 82 integrally extends outward from hub 80 about hub 80. Lip 82 provides a first axial stop for limiting movement of actuator arms 24, spacers 64, 66, 68 and coil assembly 44 along an axis of hub 80. As can be appreciated, various other structures in lieu of lip 82 may be used for providing the first axial stop for limiting movement of actuator arms 24, spacers 64, 66, 68 and coil assembly 44 along the axis of hub 80. For example, hub 80 may alternatively additionally include an external groove and an external snap ring positioned within the external groove to serve as an axial stop in lieu of lip 82.

Axial stop 62 is positioned opposite lip 82 and provides a second axial stop for capturing and retaining actuator arms 24, spacer 64, 66, 68, coil assembly 44 and spring 70 about hub 80 of arbor 50. Axial stop 62 preferably comprises an external snap ring sized for being receiving within groove 90 of hub 80. Axial stop 62 preferably has a radial width so as to extend outward from the outer circumferential surface of hub 80. Axial stop 62 limits movement of actuator arms 24, spacers 64, 66, 68, coil assembly 44 and spring 70 along the axis of hub 80.

Spacers 64, 66, 68 each comprise generally annular shaped rings having an inner diameter 92 greater than the outer diameter of hub 80, an upper surface 94 and a lower surface 96 for abutting mounting portions 48 and 52 of actuator arms 24 and coil assembly 44, respectively. Spacers 64, 66, 68 each have an axial length or thickness for correspondingly spacing apart actuator arms 24a, 24b, 24c and 24d from one another so as to position actuator arms 24a, 24b, 24c and 24d on opposite sides of memory storage discs 16 (shown in FIG. 1). Upon assembly, spacer 64 is coupled about hub 80 between actuator arms 24a and 24b. Spacer 66 is coupled about hub 80 between actuator arms 24b and 24c. Spacer 68 is coupled about hub 80 between actuator arms 24c and coil assembly 44 and actuator arm 24d. In lieu of spacer 68, coil assembly 44 may alternatively be configured for acting as a spacer between actuator arms 24c and 24d. As can further be appreciated, the number of spacers is dependent upon the number of actuator arms and memory storage discs employed in the disc drive.

Spring 70 comprises a conventionally known spring captured between the first axial stop provided by lip 82 and the second axial stop provided by axial stop 62. Spring 70 applies a pure axial force to actuator arms 24a, 24b, 24c, 24d, spacers 64, 66, 68 and coil assembly 44. As a result, spring 70 does not introduce rotational forces which may cause alignment difficulties during assembly. In addition, spring 70 prevents slipping of individual arms and other components in the stacked actuator assembly and prevents misalignment of actuator arms 24 caused by thermal shifting or mechanical shock and vibration after assembly. Spring 70 is preferably a conical or disc spring having an inner diameter 96 greater than the outer diameter of hub 80 to enable spring 70 to encircle hub 80. At the same time, inner diameter 96 is less than an outer diameter of axial stop 62 to prevent axial movement of spring 70 past axial stop 62. Spring 70 preferably has an outer diameter 98 greater than the inner diameter of mounting portions 48 and 52 of actuator arms 24 and coil assembly 44, respectively. Spring 70 applies an axial force or load along an axis of hub 80 to clamp actuator arms 24a, 24b, 24c and 24d between lip 82 of arbor 60 and axial stop 62. Spring 70 preferably comprises a belleville spring or washer. Alternatively, spring 70 may comprise anyone of a variety of spring mechanisms such as helical springs, volute springs, conical springs, slotted washer springs, curved washer springs, finger washer springs or wave washer springs for applying an axial force.

Bearing assembly 72 preferably comprises a conventionally known bearing cartridge sized for being received within axial bore 86. As conventionally known, bearing assembly 72 is axially secured within arbor 60 by bearing fastener 74. Bearing fastener 74 preferably consists of a bowed internal snap ring which is positioned within internal groove 88 of hub 80 and which engages bearing assembly 72 to retain bearing assembly 72 within bore 86 of arbor 60. Fastener 74 applies an axial force down on the top of bearing assembly 72 to keep bearing 72 in place with enough force to resist shock. As can be appreciated, fastener 74 may alternatively consist of any one of a variety of well-known conventional spring or retainers positioned within internal groove 88 of hub 80 to retain bearing assembly 72 within bore 86 of arbor 60. As conventionally known, bearing assembly 72 enables actuator arms 24 and coil assembly 44 to rotate about the axis of bearing assembly 72 for positioning of actuator arms 24. Although actuator assembly 20 has been illustrated as including a distinct bearing assembly 72 retained within arbor 60, arbor 60 and bearing assembly 72 may alternatively be integrally formed as a single component.

FIG. 3 is a cross-sectional view of disc drive 10 illustrating actuator assembly 20. As best shown by FIG. 3, threaded fastener 28 extends through bearing assembly 72 to mount actuator assembly 20 to housing 12. Bearing assembly fastener 74, preferably a bowed internal snap ring, is received within groove 88 and applies axial force to the outer housing of bearing assembly 72 and between bearing assembly 72 to secure bearing assembly 72 within bore 86 of hub 80. As a result, the outer race or housing of the bearing assembly 72, arbor 60, actuator arms 24a, 24b, 24c, 24d and coil assembly 44 rotate about axis 27.

As further shown by FIG. 3, hub 80 extends through openings 50 and 54 of actuator arms 24 and coil assembly 44, respectively to align actuator arms 24 and coil assembly 44 about hub 80 and about axis 27. In particular, actuator arms 24a, 24b, 24c, 24d, spacers 64, 66, 68 and spring 70 are positioned about hub 80 between lip 82 of arbor 60 and axial stop 62 in a stacked assembly. Spacer 64 spaces apart actuator arm 24a from actuator arm 24b. Spacer 66 spaces apart actuator arm 24b from actuator arm 24c. Spacer 68 spaces apart actuator arm 24c from coil assembly 44 and from actuator arm 24d. Spring 70 delivers an axial load or force between axial stop 62 and lip 82 to clamp actuator arms 24a, 24b, 24c, 24d, spacers 64, 66, 68 and coil assembly 44 between lip 82 of arbor 50 and axial stop 62. Spring 70 delivers a pure axial load to actuator arms 24, spacers 64, 66, 68 and coil assembly 44 to press actuator arms 24, spacers 64, 66, 68 and coil assembly 44 towards lip 82 of arbor 60. As a result, spring 70 prevents misalignment of actuator arms 24 that often results from thermal shifting, mechanical shock or vibration after assembly. In addition, spring 70 prevents slipping of individual arms or other components in actuator assembly 20 to ensure proper alignment without inducing rotational forces which may cause alignment difficulties during assembly. Thus, spring 70 fixes and reliably maintains actuator arms 24 of actuator assembly 20 in proper alignment.

Although the present invention has been described with reference to preferred embodiments, workers skilled in the art will recognize that changes may be made in form and detail without departing from the spirit and scope of the invention.

What is claimed is:

1. A stacked actuator assembly comprising:

a hub having an axis of rotation;

a first member fixed in a first direction along the axis of the hub;

a second member fixed in a second opposite direction along the axis of the hub;

an actuator arm coupled about the hub between the first and second members; and a spring coupled about the hub between the first and second members to axially clamp the actuator arm between the first and second members.

2. The actuator assembly of claim 1 wherein the first member comprises a ring extending about the hub and axially fixed to the hub.

3. The actuator assembly of claim 2 wherein the first ring comprises a lip integrally extending from the hub.

4. The actuator assembly of claim 1 wherein the second axially fixed member comprises a ring extending about the hub and axially fixed to the hub.

5. The actuator assembly of claim 4 wherein the hub includes an external groove circumferentially extending about the hub and wherein the second ring comprises an external snap ring positioned within the groove.

6. The actuator assembly of claim 1 including a bearing assembly within the hub.

7. The actuator assembly of claim 1 wherein the spring comprises a belleville washer.

8. A stacked actuator assembly comprising:

a hub having an axis of rotation;

a first axial stop extending about the hub and fixed along the axis of the hub;

a second axial stop extending about the hub and fixed along the axis of the hub;

a plurality of actuator arms coupled about the hub between the first and second axial stops;

a spacer coupled about the hub between the plurality of actuator arms; and a spring coupled about the hub between the first and second axial stop to axially clamp the plurality of actuator arms between the first and second axial stops.

9. The actuator assembly of claim 8 wherein the hub includes a bearing assembly within the hub.

10. The actuator assembly of claim 8 wherein the first axial stop comprises a lip integrally extending from the hub.

11. The actuator assembly of claim 8 wherein the hub includes an external groove circumferentially extending about the hub and wherein the second axial stop comprises an external snap ring positioned within the groove.

12. The actuator assembly of claim 8 wherein the spring comprises a belleville washer.

13. A stacked actuator assembly comprising:

an arbor having an outward extending lip at a first end and a circumferentially extending groove at a second end;

an external snap ring positioned within the external groove of the arbor;

a plurality of actuator arms coupled about the arbor between the lip and the external snap ring;

a spacer coupled about the arbor between the plurality of actuator arms;

a fan tail coupled about the arbor between the lip and the external snap ring; and a spring coupled about the arbor between the lip and the external snap ring to axially clamp the fan tail and the plurality of actuator arms between the lip and the external snap ring.

* * * * *